United States Patent [19]

Kato

[11] Patent Number: 4,844,359
[45] Date of Patent: Jul. 4, 1989

[54] CABLE REEL

[75] Inventor: Hironori Kato, Miyagi, Japan

[73] Assignee: Alps Electric Co., Ltd., Japan

[21] Appl. No.: 228,670

[22] Filed: Aug. 4, 1988

[30] Foreign Application Priority Data

Dec. 10, 1987 [JP] Japan .............................. 62-187161[U]
Dec. 10, 1987 [JP] Japan .............................. 62-187162[U]

[51] Int. Cl.$^4$ ............................................ B65H 75/02
[52] U.S. Cl. .................................... 242/54 R; 242/85;
439/15; 180/78; 280/731; 191/12.2 R
[58] Field of Search ........ 242/85, 54 R, 107.1-107.15;
191/12.2 R, 12.2 A, 12.4; 280/731; 180/78;
439/15; 174/86

[56] References Cited

U.S. PATENT DOCUMENTS

| 3,106,368 | 10/1963 | Tait et al. | 242/107.1 |
| 3,144,218 | 8/1964 | Tepe | 242/107.1 |
| 3,525,536 | 8/1970 | Pruneski | 280/731 |
| 3,657,491 | 4/1972 | Ryder et al. | 191/12.2 R |
| 3,763,455 | 10/1973 | Confer et al. | 439/15 |
| 3,959,608 | 5/1976 | Finlayson et al. | 191/12.2 R |
| 4,542,858 | 9/1985 | Manges | 242/54 R |
| 4,572,313 | 2/1986 | Ono et al. | 180/78 |
| 4,735,573 | 4/1988 | Zeller et al. | 439/15 |
| 4,789,342 | 12/1988 | Shitanoki | 439/15 |

FOREIGN PATENT DOCUMENTS 2096410 10/1982 United Kingdom ................ 280/731

Primary Examiner—John M. Jillions
Attorney, Agent, or Firm—Guy W. Shoup; Paul J. Winters

[57] ABSTRACT

A cable for holding a flat cable for electrical connection between a stationary member and a movable member includes a cylindrical inner wall defined by a partition wall formed on the movable member and a circumferential surface portion formed on a stopper member so that the flat cable is reeled on the outer circumferential surface of the inner wall.

3 Claims, 3 Drawing Sheets

CABLE REEL

FIELD OF THE INVENTION

This invention relates to a cable reel using a flat cable for electrical connection between a stationary member and a movable member, and more particularly to a cable reel for optimum use in a vehicle steering.

BACKGROUND OF THE INVENTION

A cable reel includes a flat cable having one end secured to a stationary member and the other end secured to a movable member so that the flat cable is reeled on or supplied from the movable member in response to a rotation of the movable member, so as to rotate the movable member by a predetermined amount, and the cable reel is used in a vehicle steering assembly, etc.

FIGS. 3 through 5 show a prior art cable reel of this type for use in a vehicle. FIG. 3 is an exploded perspective view, FIG. 4 is a longitudinal cross-sectional view, and FIG. 5 is a plan view in which a movable member is partly not shown. In these drawings, reference numeral 1 designates a movable member which includes a rotary cylinder 3 extending vertically at the center thereof and having a shaft insertion hole 2. A cylindrical holder 4 is provided outside the rotary cylinder 3. The holder 4 has a vertically extending slit 4a and a recess 4b offset from the inner surface thereof. The holder 4 is secured to a top plate of the movable member 1 and defines a predetermined space between the outer peripheral surface of the rotary cylinder 3 and itself.

Reference numeral 5 designates a flexible flat cable including an embedded conductive film. One end portion of the flat cable 5 passes through the slit 4a of the holder 4, and it is re-directed by turning a right angle in the recess 4b along a turning line of about 45 degrees and then extends to the exterior of the movable member 1. At the re-directing portion, the flat cable 5 is bifurcated along its length direction into two outlets 5a-5a which are re-directed individually so as to extend outwardly in an overlapping alignment. These outlets 5a-5a are conjoined by a snapping engagement and are sandwichingly held between first and second stoppers 6 and 7 secured to the top plate of the movable member 1. In this configuration, a tapered portion 6a of the first stopper 6 is inserted in the re-directing portions of the outlets 5a-5a.

Reference numeral 8 designates a stationary member which is provided with a center hole 9 which pivotably supports the rotary cylinder 3 of the movable member 1 in a snapping engagement therewith. The stationary member 8 has a vertical outer-limit peripheral wall 10 for storage of the flat cable 5. The outer-limit peripheral wall 10 has a guide portion 11 extending in the lower diagonal direction to guide the other end of the flat cable 5 once turned by a right angle inside the outer peripheral wall 10 to the exterior of the stationary member 8. The outer-most peripheral wall 10 is also provided with a positioning mechanism 13 having a gear 12 which is configured to rotate every predetermined angle by engagement with an engaging projection 14 extending from the outer peripheral wall of the movable member 1.

The cable reel is generally arranged as described above, and the movable member 1 is combined with a steering wheel of a vehicle steering assembly or other various devices while the stationary member 8 is combined with a bearing of a steering shaft. In this arrangement, when the steering wheel (movable member 1) is rotated in one direction, the flat cable 5 is reeled up toward the holder 4 of the movable member 1, and when the steering wheel is rotated in the opposite direction, the flat cable 5 is reeled off toward the outer-limit peripheral wall 10 of the stationary member 8. In either condition, electrical connection between the movable member 1 and the stationary member 8 is maintained via the flat cable 5. Further, since the gear 12 engages the projection 14 and is rotated thereby a predetermined angle upon every full rotation of the movable member 1, selected one of teeth of the gear 12 and a casing of the positioning mechanism may be marked with suitable indication in order to eliminate a difference between the rotating amounts in opposite directions of the flat cable 5 to prevent fracture or buckling of flat cable 5.

In the aforegoing prior art cable reel, however, the flat cable 5 is bifurcated in the length direction thereof before extended to the exterior of the movable member 1, and the respective outlets 5a-5a are re-directed individually so as to exhibit an overlapping alignment. This arrangement is certainly advantageous in that the diameter of a member (holder 4 in the aforegoing prior art) for winding the inner portion of the flat cable 5 thereof can be reduced because the width (shown at A in FIG. 5) of the inner portion of the flat cable 5 is about half the width of a non-bifurcated flat cable. However, the arrangement requires the manufacturing process of individually turning the bifurcated outlets of the flat cable 5 and two individual connectors for respective ends of the outlets 5a-5a for connection to an external device. This apparently increases the manufacturing cost.

OBJECT OF THE INVENTION

It is therefore an object of the invention to provide a cable reel which enables dimensional and cost reduction and facilitates its assembling process.

SUMMARY OF THE INVENTION

According to the invention, there is provided a cable reel including a movable member having a rotary cylinder at the center thereof, a stationary member rotatably supporting the movable member and a flat cable multiple-turned and held between the movable member and the stationary member, said flat cable having one end re-directed at a first re-directing point and extended to the exterior of the movable member and the other end re-directed at a second re-directing point and extended to the exterior of the stationary member, said cable reel being particularly characterized in that a cylindrical inner wall is provided outside said rotary cylinder in an eccentric relationship therewith, said first turning point of said flat cable being positioned inside said inner wall.

Eccentric disposition of the inner wall for winding the inner portion of the flat cable thereon against the rotary cylinder at the center of the movable member provides for a space which is used to position the re-directing point of the flat cable inside the inner wall. Therefore, when the inner end of the flat cable having its non-bifurcated, full width is extended to the exterior of the movable member, this does not invite an increase in the diameter of the inner wall. That is, the diameter of the cable reel can be reduced while maintaining the circumferential length required for winding the inner portion of the flat cable thereon.

BRIEF DESCRIPTION OF THE DRAWINGS

FIGS. 3 through 5 show a prior art cable reel in which FIG. 3 is an exploded perspective view, FIG. 4 is a cross-sectional view, and FIG. 5 is a plan view in which a movable member is shown as being partly cut out.

DETAILED DESCRIPTION

Figure 1:
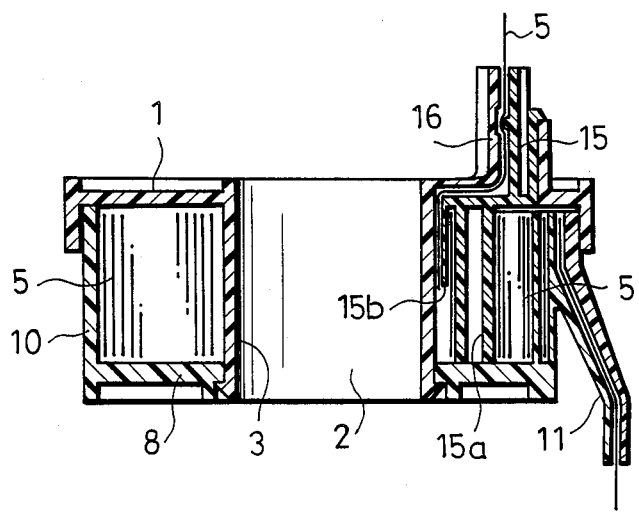
FIG. 1 is a longitudinal cross-sectional view of a cable reel embodying the invention.

The invention is described below in detail, referring to a preferred embodiment illustrated in the drawings.

Figure 2:
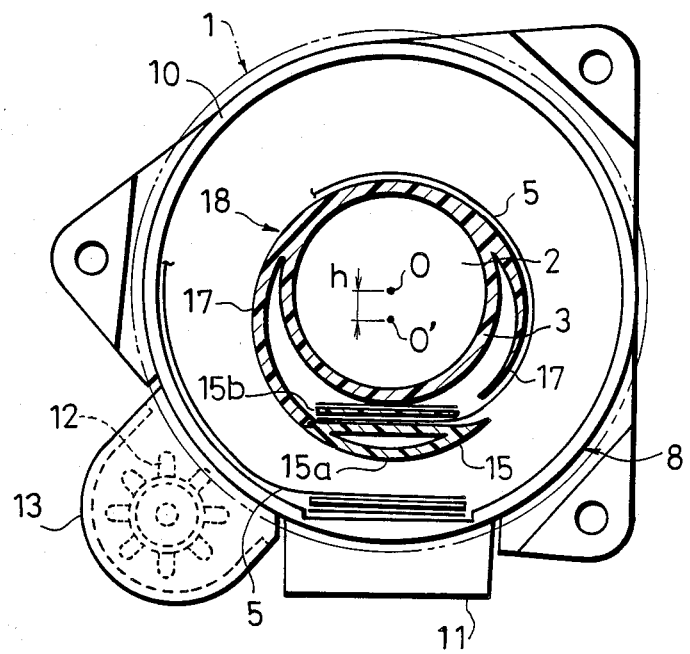
FIG. 2 is a plan view of the same cable reel in which a movable member used therein is shown as being partly cut out.
Figure 3:
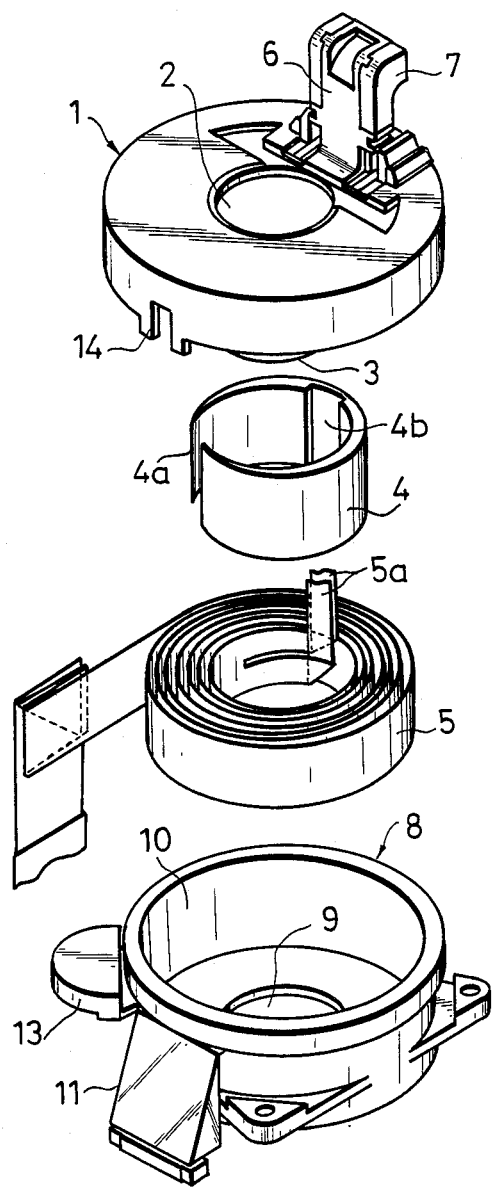
Figure 4:
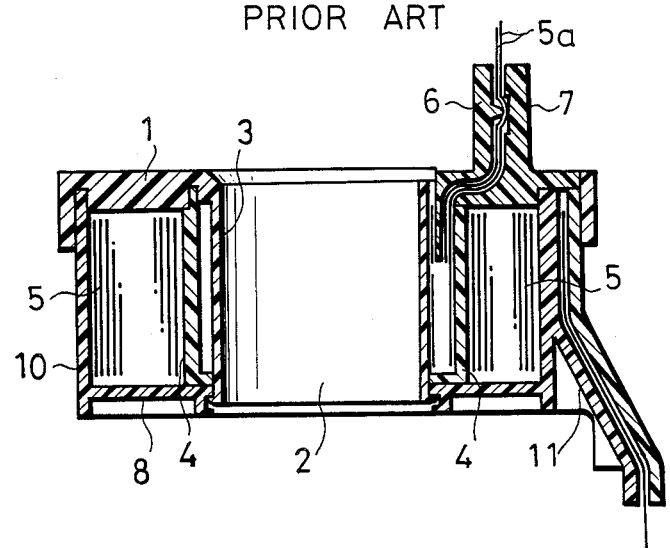
Figure 5:
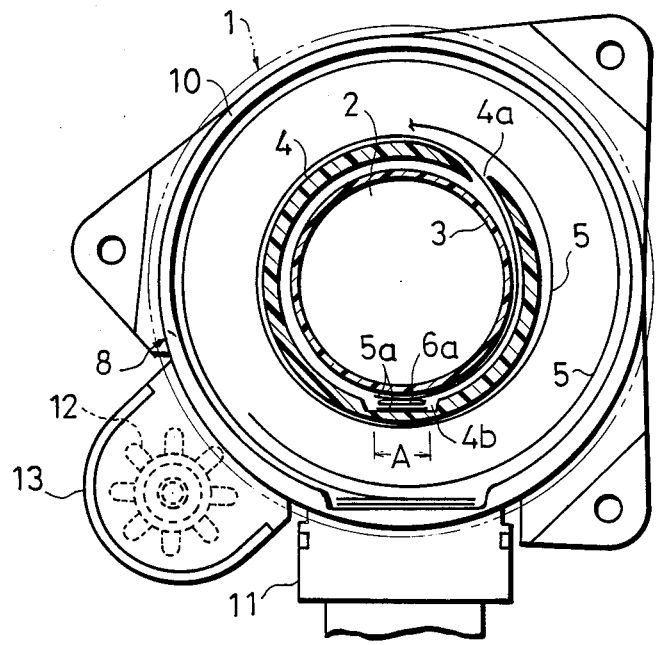

FIG. 1 is a longitudinal cross-sectional view of a cable reel embodying the invention, and FIG. 2 is a plan view of the same cable reel in which a movable member is shown as being partly cut out. Parts or members in the embodiment of FIGS. 1 and 2 equivalent to those of the prior art cable reel of FIGS. 3 through 5 are designated by the same reference numerals, and their explanation is omitted here to avoid needless prolixity of description.

In these drawings, reference numeral 15 denotes a first stopper, and 16 designates a second stopper. These stoppers 15 and 16 are united by a snap-in engagement, and are engagingly fixed to the top plate of the movable member 1. The first stopper 15 extends into the interior of the cable reel, and includes a circumferential surface portion 15a and a tapered portion 15b having a triangular distal end inside the circumferential surface portion 15a. At the center of the movable member 1 is provided the vertically standing rotary cylinder 3 described above. Outside the rotary cylinder 3 is provided a partition wall 17 which is partly continuous with the rotary cylinder 3. The continuous circumferential surface defined by the partition wall 17 and the circumferential surface portion 15a of the stopper 15 form an inner wall 18 which exhibits a substantially complete roundness as viewed in a plan view. When indicating the center of the inner wall 18 by O' and the center of the rotary cylinder 3 by O, these centers are eccentrical (offset) by a predetermined amount h as provides for a sufficient length from the outer circumferential surface of the rotary cylinder 3 to the inner wall 18 at one side (opposed to the first stopper 15).

The flat cable 5 is multiple-turned and held in the space between the inner wall 18 of the movable member 1 and the outer-limit wall 10 of the stationary member 8, with its outer end being re-directed by a right angle inside the outer-limit wall 10 and subsequently extended to the exterior of the stationary member 8 along the guide portion 11 as in the above-described prior art device. On the other hand, the inner end of the flat cable 5 is inserted through the slit between the first stopper 15 and the partition wall 17 into the interior of the first stopper 15 where the flat cable 5 is re-directed by a right angle and subsequently extended to the exterior of the movable member 1. At this re-directing point is positioned the tapered portion 15b. In this case, since a sufficient space is provided inside the first stopper 15, the re-directing portion of the flat cable not bifurcated can be disposed inside the inner wall 18, and the flat cable 5 re-directed in this fashion is sandwichingly held by both stoppers 15 and 16, and is further extended to the exterior of the movable member 1.

When the inventive cable reel having the above-described arrangement is incorporated in a vehicle steering assembly, upon a rotation of the steering the wheel (movable member 1) in one direction, flat cable 5 is reeled on the outer circumferential surface of the inner wall 18 defined by the first stopper 15 and the partition wall 17. Upon an opposite rotation of the steering wheel, the flat cable 5 is reeled back to the outer-limit wall 10 of the stationary member 8. In this case, the flat cable 5 reeled back to the space between the outer-limit wall 10 and the inner wall 18 becomes more dense at the side of the first stopper than the opposite side due to the offset relationship between the center O' of the inner wall 18 and the center O of the rotary cylinder 3. However, this does not prevent rotation of the flat cable 5 provided that the space outside the first stopper 15 is large enough to accept the maximum diameter of the multiple-turned flat cable 5.

In the aforegoing embodiment of the invention, since the inner wall 18 for providing a necessary reel-up diameter for the inner portion of the flat cable 5 is positioned in an eccentrical relationship with the rotary cylinder 3, the space defined between the inner wall 18 and the rotary cylinder 3 is partly wide. Therefore, the re-directing, turning portion of the flat cable 5 not bifurcated in its width direction is accepted in the space. This facilitates its assembling process and reduces the number of connectors to decrease the manufacturing cost. Further, since the inner wall 18 is defined by the partition wall 17 integrally formed with the movable member 1 and the circumferential surface portion 15a of the first stopper 15, the holder used in the prior art device may be omitted. This apparently contributes to a further reduction of the manufacturing cost.

Although the inner wall 18 is shown as being defined by the first stopper 15 and the partition wall 17 in the aforegoing embodiment, it is possible to replace this arrangement by a cylindrical holder used as an inner wall which is secured to the movable member 1 in an eccentric relationship with respect to the center of the rotary cylinder 3.

As described above, since the invention uses an inner wall for winding the inner portion of the flat cable thereon provided in an eccentric relationship with the rotary cylinder at the center of the movable member so that the eccentric arrangement provides for an enlarged space large enough to accept the re-directing, turning portion of the flat cable. Therefore, the inner end of the flat cable need not be bifurcated but may be redirected and extended to the exterior of the movable member in the non-bifurcate, original configuration. Additionally, the non-bifurcated flat cable requires only one connector to be attached to the externally extended end thereof while the bifurcated flat cable in the prior art device required two connectors. Therefore, the inventive cable reel attains its scale and cost reduction and facilitates its assembling process.

Beside this, since the invention uses the circumferential surface portion of the stopper member originally required to fixture of the flat cable in cooperation with the partition wall integrally formed with the movable member to provide a necessary diameter for winding the inner portion of the flat cable thereon, it contributes to a reduction in the number of parts or members of the cable reel.

What is claimed is:

1. In a cable reel including a movable member having a rotary cylinder at the center thereof, a stationary member rotatably supporting the movable member and a flat cable multiple-turned and held between the movable member and the stationary member, said flat cable having one end re-directed at a first re-directing point and extended to the exterior of the movable member and the other end re-directed at a second re-directing point and extended to the exterior of the stationary member, an improvement wherein a cylindrical inner wall is provided outside said rotary cylinder in an eccentric relationship therewith, said first re-directing point of said flat cable being positioned inside said inner wall.

2. A cable reel according to claim 1 wherein said movable member is provided with a partition wall forming a part of said cylindrical inner wall, said movable member including a stopper member, and said stopper member is provided with a circumferential wall member forming the other part of said inner wall, so that an inner portion of said flat cable is reeled on the outer circumferential surface of said inner wall.

3. A cable reel according to claim 1 wherein said inner wall consists of a partition wall integrally formed with said movable member and a circumferential surface portion of a first stopper secured to said movable member.

* * * * *